United States Patent
McDaniel et al.

(10) Patent No.: US 11,385,575 B2
(45) Date of Patent: Jul. 12, 2022

(54) FUSER ROLLERS

(71) Applicant: Hewlett-Packard Development Company, L.P., Spring, TX (US)

(72) Inventors: Gabriel Scott McDaniel, Boise, ID (US); Sean Daniel FitzGerald, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,671

(22) PCT Filed: Nov. 2, 2018

(86) PCT No.: PCT/US2018/058912
§ 371 (c)(1),
(2) Date: Dec. 29, 2020

(87) PCT Pub. No.: WO2020/091803
PCT Pub. Date: May 7, 2020

(65) Prior Publication Data
US 2021/0270594 A1 Sep. 2, 2021

(51) Int. Cl.
*G03G 15/20* (2006.01)
*G03G 15/00* (2006.01)
*G01B 7/34* (2006.01)

(52) U.S. Cl.
CPC ....... *G03G 15/2003* (2013.01); *G03G 15/553* (2013.01); *G01B 7/34* (2013.01); *G03G 2215/20* (2013.01)

(58) Field of Classification Search
CPC .................................................. G03G 15/553
See application file for complete search history.

(56) References Cited

U.S. PATENT DOCUMENTS

| | | | | |
|---|---|---|---|---|
| 5,428,437 A | * | 6/1995 | Carter | B65H 27/00 271/314 |
| 5,553,951 A | | 9/1996 | Simpson et al. | |
| 6,904,243 B2 | * | 6/2005 | Smith | G03G 15/75 399/159 |
| 7,257,337 B2 | | 8/2007 | Amico | |
| 7,283,777 B2 | | 10/2007 | Russel et al. | |
| 7,415,216 B2 | * | 8/2008 | Rasch | G03G 15/2039 399/69 |

(Continued)

FOREIGN PATENT DOCUMENTS

| | | |
|---|---|---|
| JP | 2009198757 A | 9/2009 |
| JP | 2014038231 A * | 2/2014 |
| JP | 2016-212185 A | 12/2016 |

*Primary Examiner* — Leon W Rhodes, Jr.
(74) *Attorney, Agent, or Firm* — Michael Dryja

(57) ABSTRACT

An example print apparatus is described as including a fuser roller, a pressure device that generates wear on a section of the fuser roller surface, and a wear detection engine that identifies a degree of wear on the surface of the fuser roller. An example fuser roller may include a tube, a heating element, and a plurality of layers having a detectable pattern. An example print apparatus may include a wear detection engine having an emitter, a detector, and a controller that identifies a wear pattern based on data provided by the detector in response to activation of the emitter and determines a degree of wear based on the identified wear pattern.

19 Claims, 7 Drawing Sheets

(56) References Cited

U.S. PATENT DOCUMENTS

| | | | |
|---|---|---|---|
| 7,432,818 B2 * | 10/2008 | Ray | G03G 15/2053 340/572.1 |
| 7,463,836 B2 | 12/2008 | Able et al. | |
| 7,471,905 B2 * | 12/2008 | Cook | G03G 15/553 399/24 |
| 7,702,485 B2 | 4/2010 | Gress et al. | |
| 7,831,156 B2 * | 11/2010 | Igarashi | B41J 2/17566 399/24 |
| 7,995,936 B2 * | 8/2011 | Hamby | G03G 15/55 399/33 |
| 8,132,049 B2 | 3/2012 | Yasukawa et al. | |
| 8,681,346 B2 | 3/2014 | Ruiz et al. | |
| 8,693,021 B2 | 4/2014 | Sampath et al. | |
| 8,712,726 B2 | 4/2014 | Li et al. | |
| 2007/0204230 A1 | 8/2007 | Carling et al. | |
| 2019/0118560 A1 | 4/2019 | Martellono | |

* cited by examiner

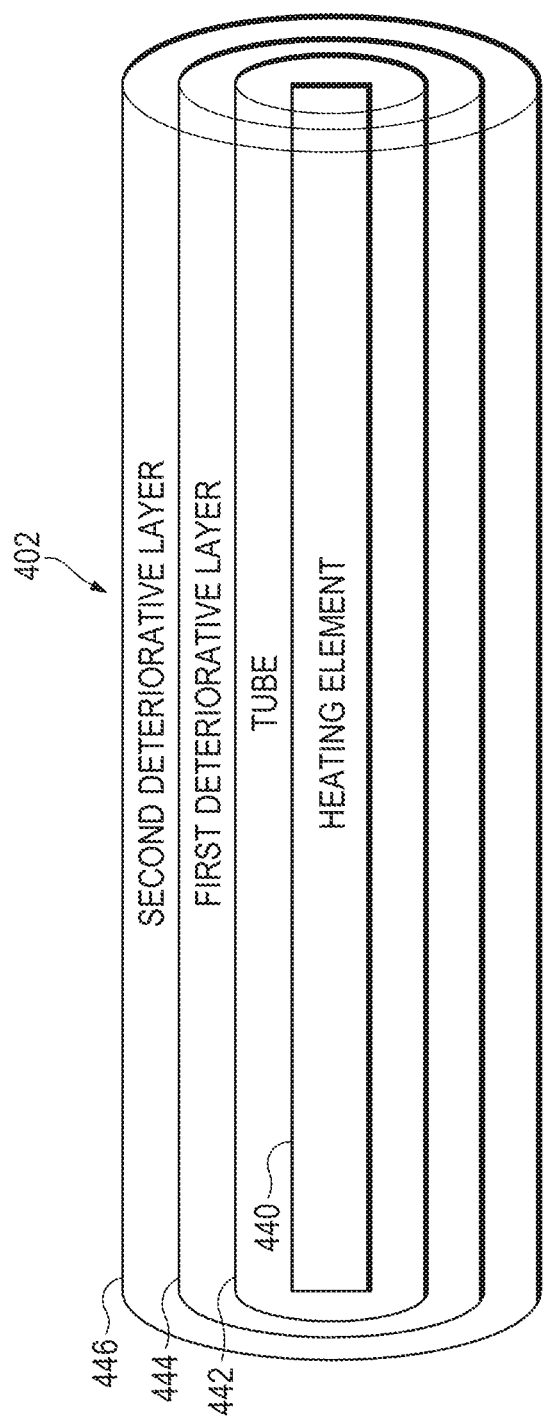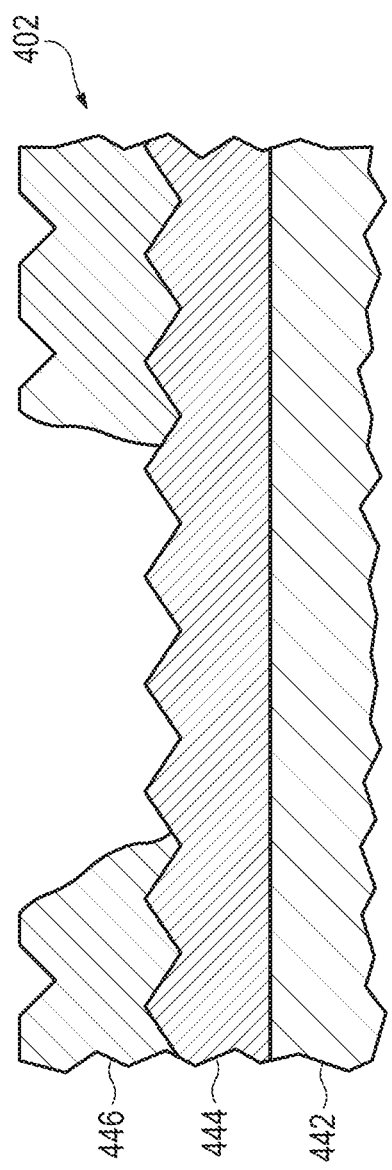
FIG. 4A
FIG. 4B

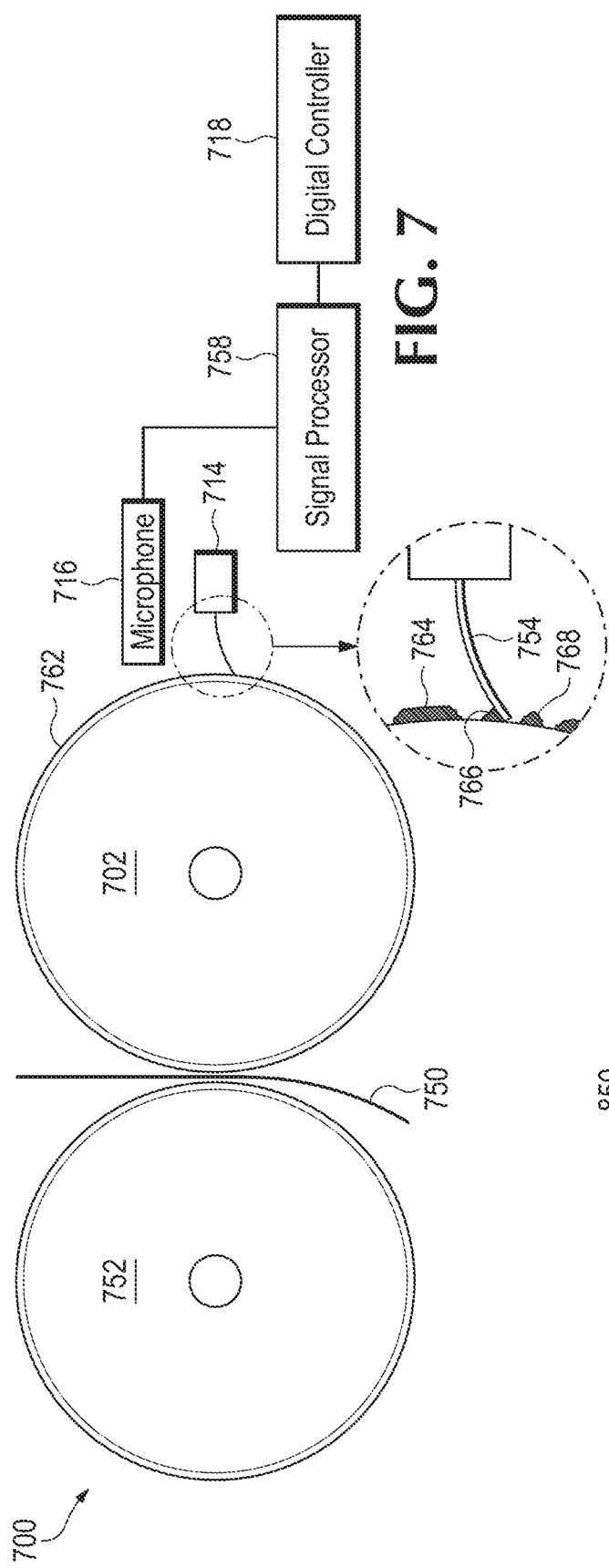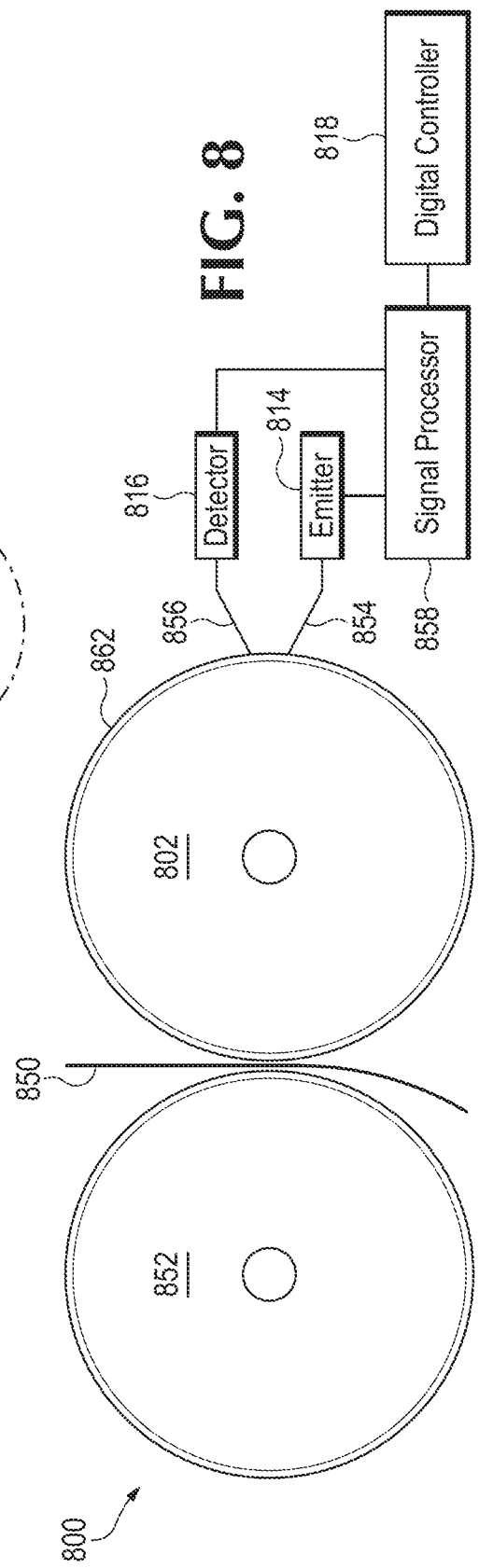

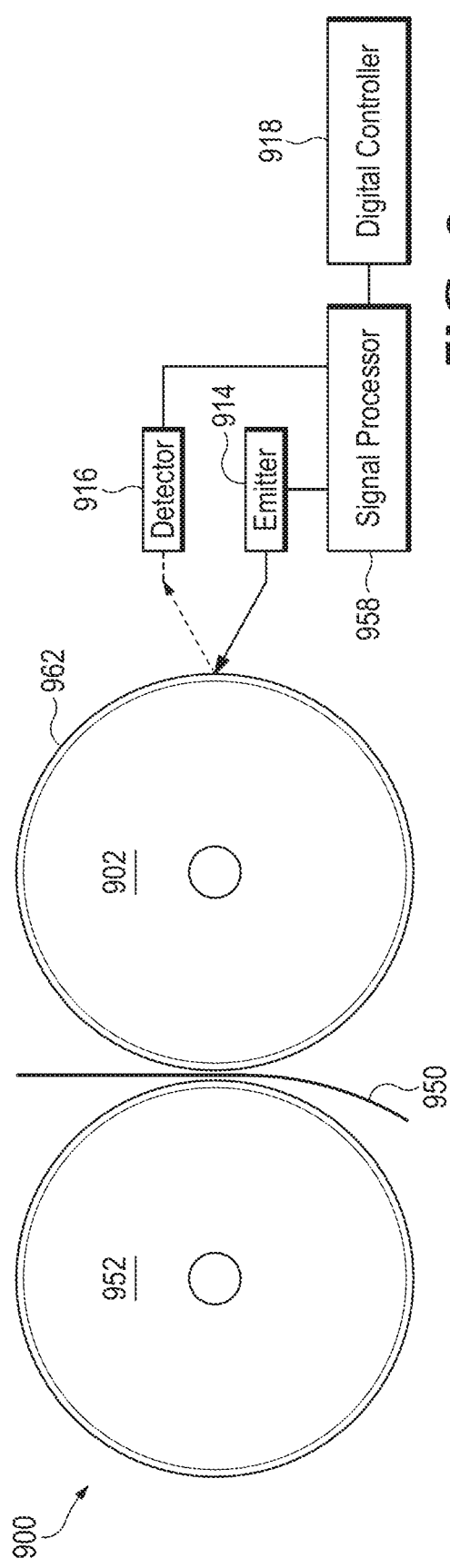
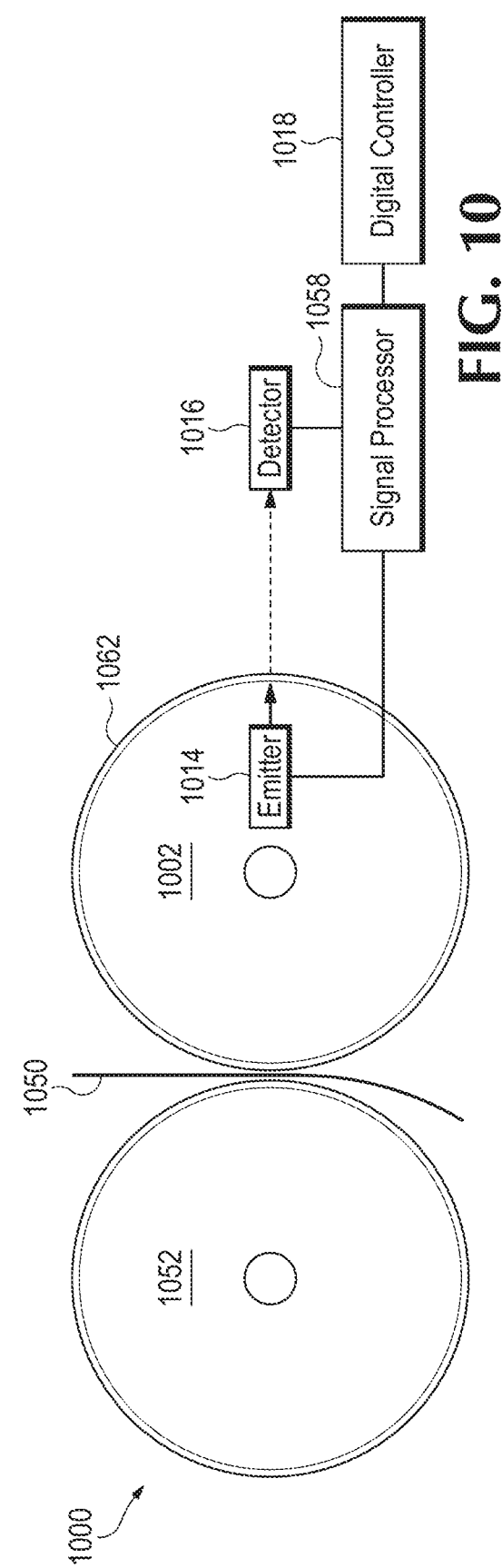

FUSER ROLLERS

BACKGROUND

Images are processed for use with computing machines, such as a print apparatus. A print apparatus, for example, may use control data based on processed image data to produce a physical representation of an image by operating a print material placement system according to the control data. The process for generating the physical representation on a print medium may include performing operations on the print material after the print material is placed on the print medium. For example, toner print material may be fused onto the print material using pressure and/or heat. Print components of the print apparatus may become worn over time which may lower print quality with respect to operation of new components. Used or faulty components may be serviced or replaced to maintain operation of the print apparatus at a desired level of image quality.

BRIEF DESCRIPTION OF THE DRAWINGS

FIG. 4A depicts an example fuser roller.

FIG. 4B depicts example layers of an example fuser roller.

FIG. 7 depicts example components of an example print apparatus that uses acoustics to detect a wear pattern.

FIG. 8 depicts example components of an example print apparatus that uses electricity to detect a wear pattern.

FIGS. 9 and 10 depict example components of example print apparatus that use light to detect a wear pattern.

DETAILED DESCRIPTION

Figure 1:
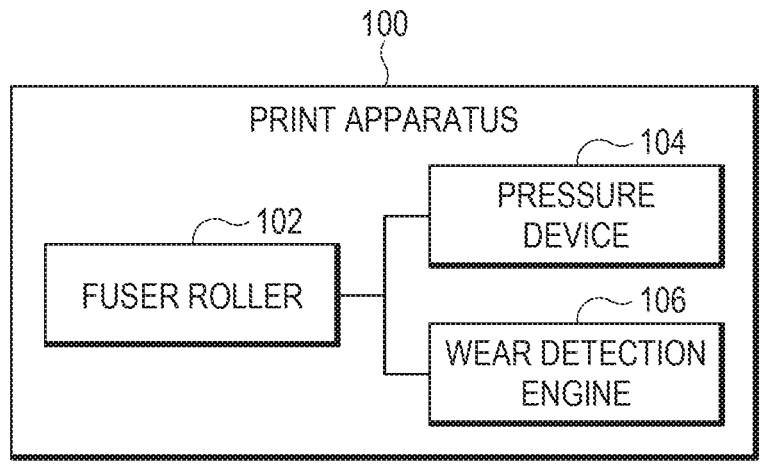
FIGS. 1-2 are block diagrams depicting example print apparatus.

In the following description and figures, some example implementations of print apparatus and print components, such as a fuser roller, are described. In examples described herein, a "print apparatus" may be a device to print content on a physical medium (e.g., paper, textiles, a layer of powder-based build material, etc.) with a print material (e.g., ink or toner). In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids, powders, or other raw materials for printing. In some examples, a print apparatus may be a three-dimensional (3D) print apparatus. An example of print material is powder toner heatable by a heat transfer device, such as carbon-based toner, plastic-based toner, or a plant-derived toner heatable by a laser or fuser. Another example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like. Toner and 3D-print powder are examples of print materials that are particles (i.e., print particles).

In some example print apparatus, a print material may be modified post-placement onto a print medium. For example, a laser print apparatus may include a pair of fuser rollers (e.g., a pressure roller and a heat roller) that place pressure and heat on a print medium in the media path to melt toner print particles to the print medium. Print components, such as post-print components that are devices for post-print operations, may become worn over time. For example, a roller surface may deteriorate after normal or extreme use. Worn components may require maintenance or replacement. A user of a print apparatus may benefit from knowing when print quality may be affected by the worn condition of a component.

Various examples described below relate to identifying a condition of wear of a fuser roller. Wear of a fuser roller may be identified on a non-media-handling section of the fuser roller based on wear generated on the fuser roller corresponding with an amount of print media that has passed through the fuser rollers. In some examples, the fuser roller is engineered with a plurality of deteriorative layers having a pattern. In some examples, a wear detection engine is a pattern detection system that identifies a pattern of wear exposed on the fuser roller and determines a condition of wear corresponding to the wear pattern. The print apparatus may use the condition of the fuser roller. For example, potential and/or current failure of a fuser system may be identified based on the determined wear of the fuser roller, and the information may be used to instruct the user and/or request service. In this manner, downtime of a print apparatus may be minimized by accurately predicting the fuser failure point, for example.

Figure 2:
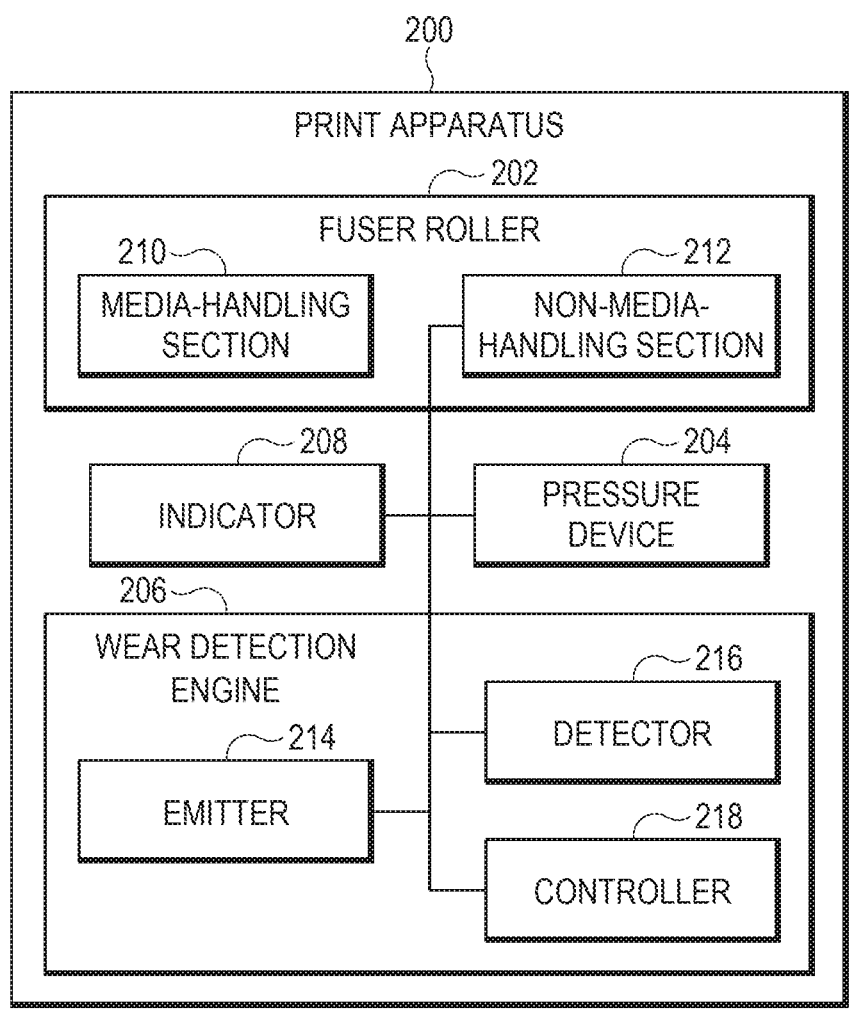

FIGS. 1-2 are block diagrams depicting example print apparatus 100 and 200. Referring to FIG. 1, the print apparatus 100 generally includes a fuser roller 102, a pressure device 104, and a wear detection engine 106. In general, the wear detection engine 106 identifies wear on the fuser roller 102 generated by the pressure device 104.

The fuser roller 102 may be a heatable roller or a pressure roller. A heatable roller may be a cylinder or tube with a heating element located within the interior of the cylinder or tube. In other example, a layer of heating material may be located around a base tubular structure. Example methods of heating the roller may include radiant heating, resistive heating, or inductive heating. The pressure roller may be a cylinder or tube with a physical surface capable of placing pressure on the heatable roller and/or a print medium between the heatable roller and the pressure roller. A fuser roller may include a deteriorative layer exposed as a surface where a print medium may come in contact with the fuser roller. A deteriorative layer, as used herein, is a layer of material that may become worn overtime with respect to heat, pressure, and contact with media on the layer. A deteriorative layer may include material more susceptible to wear than the core or base layer of the surface of the fuser roller 102. For example, the core of the fuser roller 102 may be made of an abrasion-resistant material (such as a metal) and a sacrificial, deteriorative layer may be applied on the core of the fuser roller and made of a polymer that is less resistant to abrasions (e.g., to generate a wearing effect on the layer). In this manner, the deteriorative layer may be sacrificial because the layer is engineered to be worn down in a detectable manner by the wear detection engine 106. As discussed further herein, the fuser roller may include a plurality of deteriorative layers.

The pressure device 104 may be coupled to the fuser roller. For example, the fuser roller 102 may be a heatable roller and the pressure device may be a pressure roller. For another example, the fuser roller 102 may be a heatable roller or a pressure roller and the pressure device is a separate mechanical device that exposes a non-media-handling section of the fuser roller 102 to wear. In that example, the pressure device 104 may be a piston having a tip that generates wear when in contact with the fuser roller 102 upon selective activation (e.g., activation consistent with media usage). The pressure device 104 may generate wear on the non-media-handling section of the cylindrical surface corresponding to use of the media-handling section. For example, the pressure device 104 may apply an amount of wear to the non-media-handling section that corresponds to an amount of wear generated by a print medium passing over the media-handling section of the fuser roller 102.

The wear detection engine 106 represents any circuitry or combination of circuitry and executable instructions to identify a degree of wear of a section of the fuser roller 102. For example, the wear detection engine 106 may be a combination of circuitry and executable instructions to identify a degree of wear of a non-media-handing section of the cylindrical surface of the fuser roller 102. The wear detection engine 106 may include a device capable of analyzing the surface of the fuser roller 102. For example, the wear detection engine 106 may include a camera and a controller, where the controller includes a control program that processes an image captured by the camera and analyzes the processed data to identify a condition of wear of the fuser roller 102. The wear detection engine 106 may use light, electricity, audio, visual, or other forms of signals or data to identify a degree of wear of the fuser roller 102. Further examples are discussed herein with respect to FIGS. 7-10. The wear detection engine 106 may be operable while the fuser roller 102 is in a state or rotation or in a state of rest. For example, the wear detection engine 106 may operate while print media passes by the fuser roller 102. In some examples, the detection engine 102 includes a controller that controls the pressure device 104 (e.g., applies pressure according to a number of pages of a print job).

Referring to FIG. 2, the print apparatus 200 may generally include the same components of the print apparatus 100 of FIG. 1 and the description of those components are not repeated in their entirety for brevity. The print apparatus 200 further includes components, such as an indicator, and other details.

The fuser roller 202 may include a section 210 of an exterior cylindrical surface that is a media-handling section. In other words, the section of the fuser roller is a media-handling section if the section is designed to come into contact with a print medium along the media path through the print apparatus 200. The fuser roller 202 may also include another section 212 of the exterior cylindrical surface that is a non-media-handling section. In other words, the section of the fuser roller 202 is a non-media-handling section if the section is designed to be out of the way of the media path where a print medium is not likely to come into contact with the fuser roller 202. For example, the recurring edge of media placed on the fuser roller surface may delineate the media-handling section and the non-media-handling section and recurring pressure at the edge of the print media may incur wear on the fuser roller 102.

The wear detection engine 206 may include an emitter 214, a detector 216, and a controller 218. The emitter 214 conveys a substance towards the cylindrical surface of the fuser roller 202. The emitter 214 may be located within the fuser roller 202 or located near the exterior of the fuser roller 202. The detector 216 is oriented to receive a substance from the cylindrical surface. For example, the detector 216 is oriented to receive the substance conveyed from the emitter 214. The controller 218 may process data received by the detector. For example, the controller 218 may be a chip with a control program to process a signal provided by the detector 216 and identify a degree of wear corresponding to the processed signal.

The print apparatus 200 may include an indicator 208 may be used to indicate a condition corresponding to a degree of wear. For example, the indicator 208 may be a light emitting diode (LED) that is activated when the degree of wear of the fuser roller 202 exceeds a threshold. In other examples, the indicator 208 may be a message displayed on a control panel coupled to the print apparatus 200. For yet another example, the controller 218 may determine a future condition of the fuser roller 202 based on an analysis of data from the detector 216 and cause the indicator 208 to activate to represent a future condition of the fuser roller 202.

The wear detection engine 206 may utilize deteriorative layers engineered on the fuser roller 202. For example, the fuser roller 202 may include a number of layers with different properties with respect to the substance conveyed by emitter, and the control program of the controller 218 includes instructions that, when executed, causes the controller 218 to identify a condition of the fuser roller based on data from the detector corresponding a combination of the different properties based on wear of the fuser roller 202 and operate the indicator 208 according to the condition of the fuser roller 202.

Figure 3A:
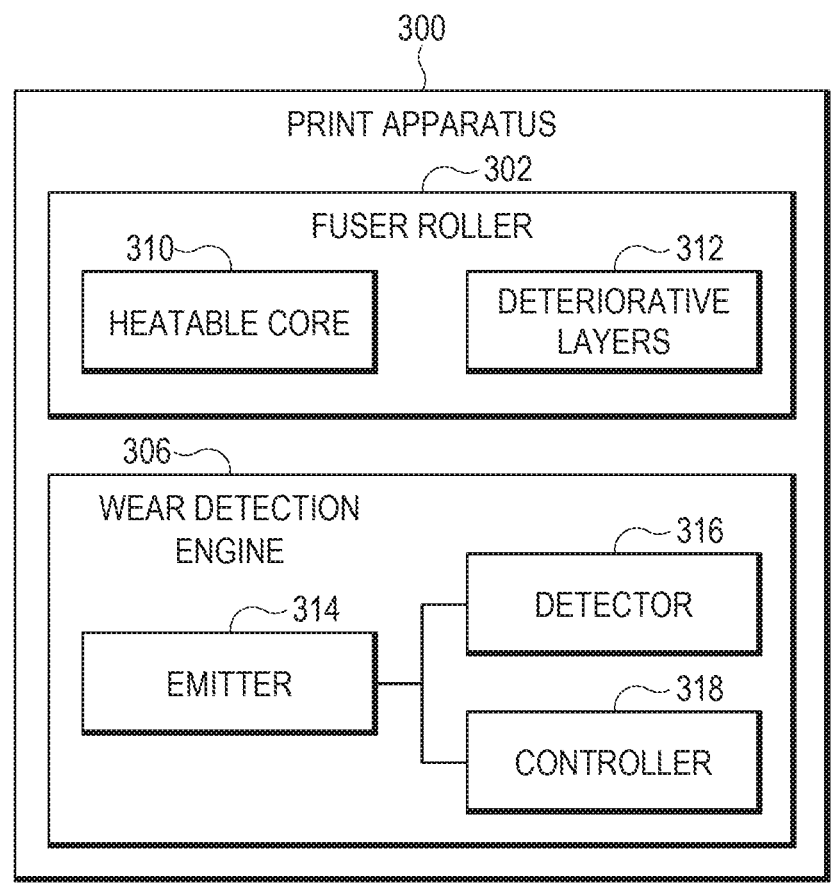
FIG. 3A is a block diagram depicting an example print apparatus.

FIG. 3A is a block diagram depicting an example print apparatus 300. The print apparatus 300 generally includes a fuser roller 302 and a wear detection engine 306. The fuser roller 302 generally includes a heatable core 310 and a plurality of deteriorative layers 312 coupled to the heatable core 310. The heatable core 310 may be made of any appropriate material suitable to heat a surface of the fuser roller 302 sufficient to bind a print material to a print medium. The heatable core 310 may include a heating element. In some examples, the heating element may be inside the core, while in other examples, the heating element may be a surface around the core. Example heating elements may include a radiant heat lamp, heat coils, and/or an induction heater. Each layer of the plurality of layers 312 may include a material property different from the other deteriorative layers. This may assist, for example, detecting wear of a particular layer. The example fuser roller attributes are discussed in more detail with respect to FIGS. 4A and 4B.

The wear detection engine 306 generally includes an emitter 314, a detector 316, and a controller 318. The emitter 314 may be any appropriate device to convey a substance towards a surface of the fuser roller 302 and the detector 316 may be any appropriate device that receives a substance from the surface of the fuser roller 302. Examples of types of emitters and detectors are discussed with respect to the descriptions of FIGS. 7-10. The controller 318 may be a combination of circuitry and executable instructions to execute a control program that determines a degree of wear and operates the emitter, the detector, and/or other components of the print apparatus 300.

Figure 3B:
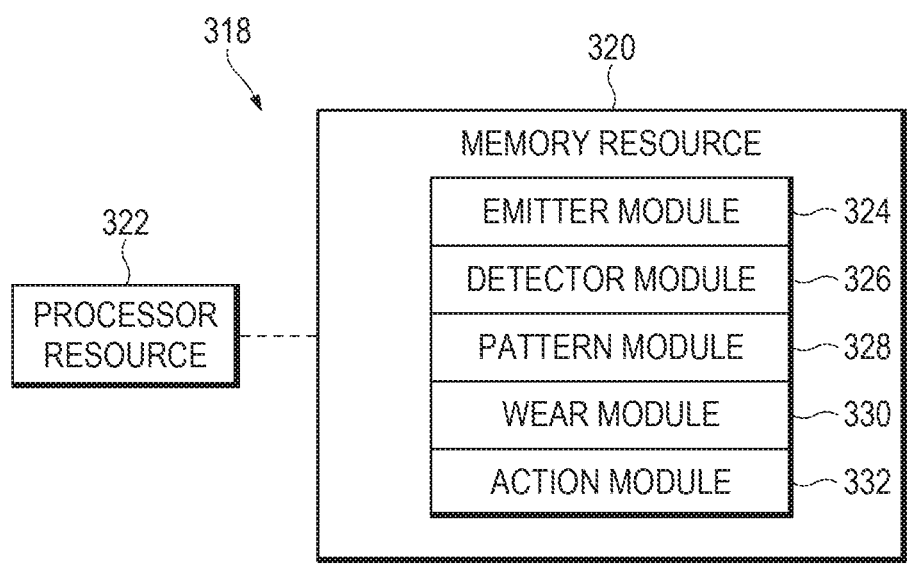
FIG. 3B is a block diagram depicting an example controller.

FIG. 3B is a block diagram depicting an example controller 318. Referring to FIG. 3B, a controller 318 may include circuitry, such as a processor resource 322 and a memory resource 320, and executable instructions, such as instructions 324-332, stored on the circuitry to perform the control program (e.g., performs the functions of the wear detection engine 306). FIG. 3 depicts the example wear detection engine 306 may comprise a memory resource 320 operatively coupled to a processor resource 322.

The memory resource 320 may contain a set of instructions that are executable by the processor resource 322. The set of instructions are operable to cause the processor resource 322 to perform operations of the wear detection engine 306 when the set of instructions are executed by the processor resource 322. The set of instructions stored on the memory resource 320 may be represented as an emitter module 324, a detector module 326, a pattern module 328, a wear module 330, and an action module 332. The emitter module 324, the detector module 326, the pattern module 328, the wear module 330, and the action module 332 represent program instructions that when executed cause function of the emitter 314, the detector 316, and/or other components of the print apparatus 300.

The processor resource 322 may carry out a set of instructions to execute the emitter module 324 to operate the emitter 314. The processor resource 322 may carry out a set of instruction to execute the detector module 326 to operate the detector 316. The processor resource 322 may carry out a set of instructions to execute the pattern module 328 to operate a processor resource (such as processor resource 322 or a separate signal processor) to identify a pattern of data produced by the detector corresponding to the surface of a fuser roller. The processor resource 322 may carry out a set of instructions to execute the wear module 330 to operate a processor resource (such as processor resource 322 or a separate controller) to determine a degree of wear based on an identified pattern of detector signals. The processor resource 322 may carry out a set of instructions to execute the action module 332 to operate a print component of a print apparatus based on a degree of wear identified corresponding to fuser roller.

The processor resource 322 may carry out a set of instructions to execute the modules 324, 326, 328, 330, 332, and/or any other appropriate operations among and/or associated with the modules of the wear detection engine 306. For example, the processor resource 322 may carry out a set of instructions to activate the emitter, identify a wear pattern based on data provided by the detector in response to activation of the emitter, and determine a degree of wear based on the identified wear pattern. For another example, the processor resource 322 may carry out a set of instructions to compare a first wear pattern of a media-handling section of the fuser roller to a second wear pattern to a non-media-handling section of the fuser roller. In an example where the fuser roller includes a plurality of deteriorative layers with encoded patterns exposable due to wear, the processor resource 322 may carry out a set of instructions to identify the encoded pattern exposed on the fuser roller; and identify a condition of the fuser roller based on the encoded pattern. In yet another example, the processor resource 322 may carry out a set of instructions to operate an emitter, operate a detector, determine a degree of wear based on an identified wear pattern, and operate a print component at a level corresponding to the determined degree of wear.

Although these particular modules and various other modules are illustrated and discussed in relation to FIG. 3B and other example implementations, other combinations or sub-combinations of modules may be included within other implementations. Said differently, although the modules illustrated in FIG. 3B and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

A processor resource is any appropriate circuitry capable of processing (e.g., computing) instructions, such as one or multiple processing elements capable of retrieving instructions from a memory resource and executing those instructions. For example, the processor resource 322 may be a central processing unit (CPU) that enables wear detection by fetching, decoding, and executing modules 324, 326, 328, 330, and 332. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the wear detection engine 306. The medium is any non-transitory medium or combination of non-transitory media able to electronically store data, such as modules of the wear detection engine 306 and/or data used by the wear detection engine 306. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the wear detection engine 306 of FIG. 3B. A memory resource may be integrated in the same device as a processor resource or it may be separate but accessible to that device and the processor resource. A memory resource may be distributed across devices.

In the discussion herein, the engines 106, 206, and 306 of FIGS. 1-3A and the modules 324, 326, 328, 330, and 332 of FIG. 3B have been described as circuitry or a combination of circuitry and executable instructions. Such components may be implemented in a number of fashions. Looking at FIG. 3B, the executable instructions may be processor-executable instructions, such as program instructions, stored on the memory resource 320, which is a tangible, non-transitory computer-readable storage medium, and the circuitry may be electronic circuitry, such as processor resource 322, for executing those instructions. The instructions residing on a memory resource may comprise any set of instructions to be executed directly (such as machine code) or indirectly (such as a script) by a processor resource.

Figure 5:
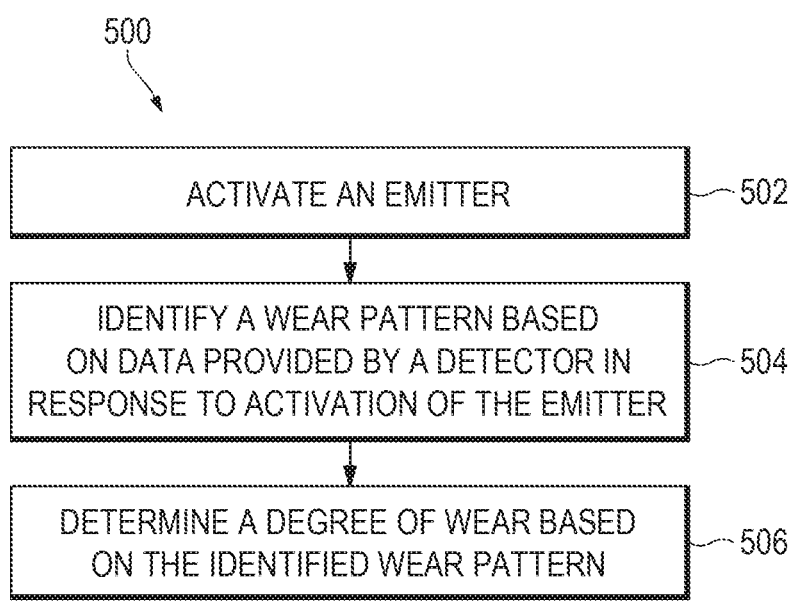
FIGS. 5 and 6 are flow diagrams depicting example methods of operating an example print apparatus with an example fuser roller.
Figure 6:
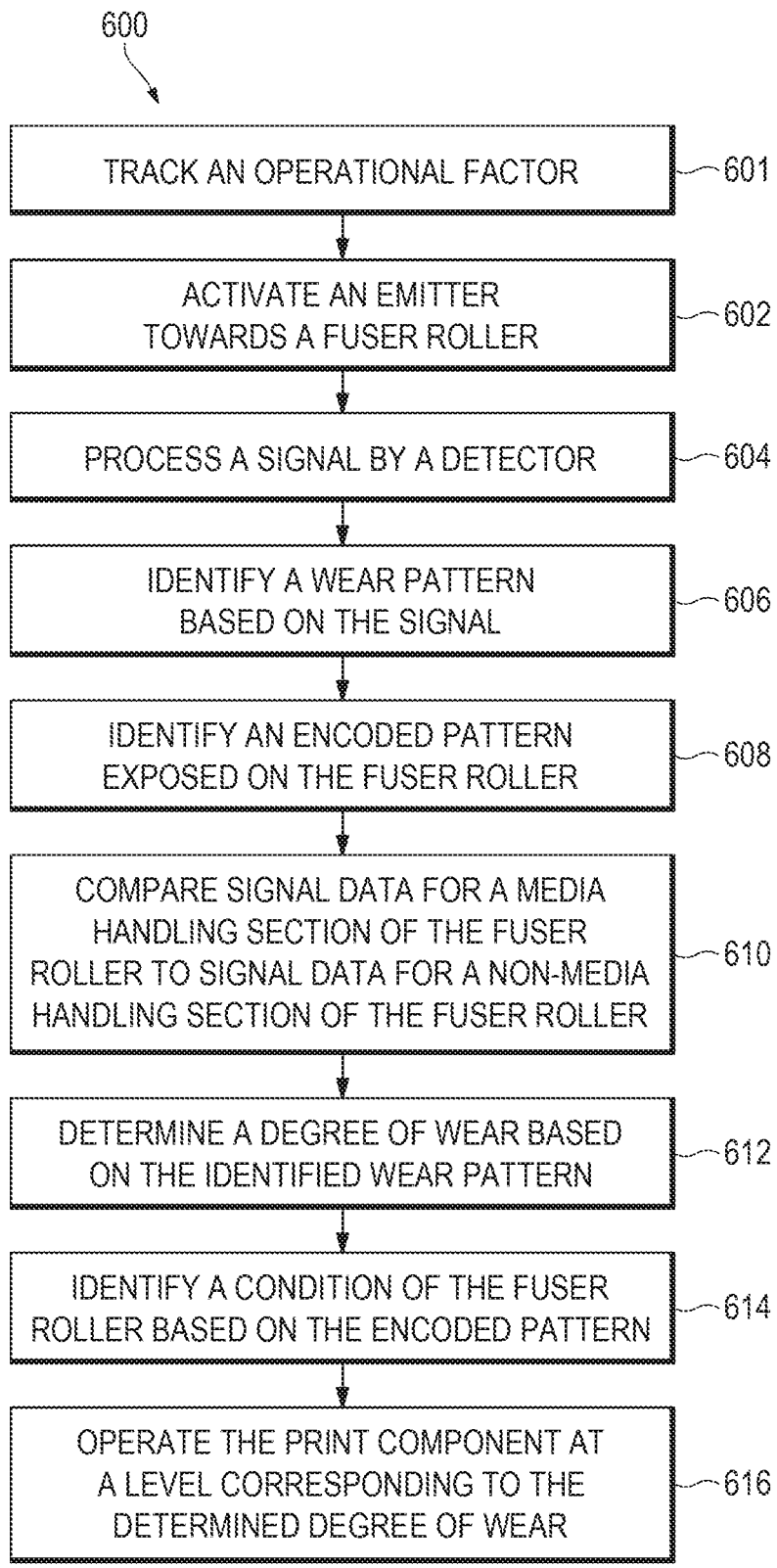

In some examples, the wear detection engine 306 may include the executable instructions may be part of an installation package that when installed may be executed by a processor resource to perform operations of the system 200, such as methods described with regards to FIGS. 5-6. In that example, a memory resource may be a portable medium such as a compact disc, a digital video disc, a flash drive, or memory maintained by a computer device, such as a web server, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

FIG. 4A depicts an example fuser roller 402. The fuser roller 402 generally includes a heating element 440, a tube 442, and a plurality of deteriorative layers. Each of the plurality of deteriorative layers may surround the tube and may include a detectable pattern. The pattern of each layer may be different or offset from the preceding and/or subsequent layer. The pattern of the first deteriorative layer 444 may be different or offset from the pattern of the second deteriorative layer 446. In other examples, the first deteriorative layer 444 may include a combination of materials of differing properties (e.g., multiple sections of material of different densities or resistance to deterioration), where the location of the materials is different on the second deteriorative layer 446. Each layer may be between 0.5 mm and 10 mm thick, as an example. For another example, each layer may be between 3 mm and 7 mm thick.

FIG. 4B depicts an example fuser roller 402 with example worn deteriorative layers. In the example of FIG. 4B, the deteriorative layer 446 has been worn through to expose the deteriorative layer 444 surrounding the core (e.g., tube 442). A detector may identify a pattern of the exposed area of layer 444 to generate a signal different from the signal generated by the detector for sections of the fuser roller where the layer 446 covers the layer 444.

FIGS. 5 and 6 are flow diagrams depicting example methods of operating an example print apparatus with an example fuser roller. Referring to FIG. 5, example methods of operating a print apparatus may generally comprise operating a detector to identify a wear pattern in response to activation of an emitter and determining a degree of wear based on the identified wear pattern. The functions discussed with respect to blocks of FIGS. 5 and 6 are performable by a wear detection engine, such as wear detection engine 106 of FIG. 1.

At block 502, an emitter is activated. The emitter may be oriented towards a fuser roller and emit a substance upon activation. The substance may be received by a detector. At block 504, a wear pattern is identified based on data provided by the detector in response to activation of the emitter at block 502. For example, the fuser roller may have a plurality of layers exposed on the surface of the fuser roller and the detector may generate a signal, such that data produced by a signal processor include data corresponding to a property of the material exposed on the surface of the fuser roller. At block 506, a degree of wear of the fuser roller is determined based on the identified wear pattern. For example, a controller may operate a control program to extrapolate a degree of wear based on the identified pattern and a benchmark. The determined degree of wear may be useable information for operation of a print apparatus.

FIG. 6 includes blocks similar to blocks of FIG. 5 and provides additional blocks and details. In particular, FIG. 6 depicts additional blocks and details generally regarding identifying an encoded pattern, comparing sections of the fuser roller, identifying a condition of the fuser roller based on a degree of wear, and operating a print component in response to the identified condition. Blocks 602, 606, and 612 are the same as blocks 502, 504, and 506 of FIG. 5 and, for brevity, their respective descriptions are not repeated.

At block 601, an operational factor may be tracked. Factors may include a degree or pattern of operation and/or environmental factors that may be tracked during operation of a print apparatus. Example factors may include operation in a humid environment, operation in high dust or talc environment, media attributes passing through the print apparatus, thermal cycling or the fuser roller, etc. Sensors coupled to the print apparatus may be used to track levels of such factors.

At block 604, a signal of the detector is processed. For example, a controller may operate a control program to process a signal provided by a detector corresponding to a pattern of wear at a section of a fuser roller.

At block 608, an encoded pattern is identified. A deteriorative layer may include an encoded pattern that when processed by a signal processor produces data corresponding to a code usable by the print apparatus. For example, the detector may produce a signal corresponding to the surface of the fuser roller that translates, via a signal processor, to an encoded pattern corresponding to a model number, a serial number, phrase, or other identifier useable by the print apparatus. In another example, the fuser roller may comprise a number of layers with different properties with respect to the substance conveyed by emitter, such that the deteriorative layers include an encoded pattern exposable based on wear to the fuser roller.

At block 610, a signal corresponding to the media-handling section of the fuser roller is compared to a non-media-handling section of the fuser roller. The difference in wear between the sections of the fuser roller may be used to determine the degree of wear of the fuser roller, such as generating an offset to compensate for age or other environmental condition.

At block 614, identify a condition of the fuser roller based on the encoded pattern. The encoded pattern identified at block 608 may indicate to which layer the wear has been generated (e.g., which is the lowest layer exposed on the surface of the fuser roller) and may indicate the degree of usefulness of the fuser roller, life remaining of the fuser roller, whether the fuser roller is unusable or broken, and/or similar or related conditions. For example, a control program may include instructions that, when executed, causes a controller to identify a condition of the fuser roller based on data from the detector corresponding a combination of the different properties based on wear of the fuser roller. The controller may use information tracked at block 601 to determine the condition of the fuser roller. For example, a controller may perform a condition analysis using compensatory factors such operational or environmental factors. The condition identified at block 614 may be a future condition, such as a predicted condition. For example, a print apparatus may include an indicator and a controller with a memory resource having instructions stored thereon that, when executed, causes the controller to track historical data corresponding to the surface of the fuser roller based on signals produced by a detector, determine a future condition of the fuser roller based on an analysis of historical data provided via the detector, and activate the indicator to represent the future condition of the fuser roller, such as a send a notification to a control panel to indicate the fuser roller is nearing the end-of-life and should be replaced.

At block 616, a print component is operated based on the condition identified at block 614. For example, upon identifying a particular condition of the fuser roller, a print component may be activated and operated at a level corresponding to the determined degree of wear. For example, a light emitting diode (LED) may be lit up to a color or brightness associated with the condition of the fuser roller. For another example, pressure from a pressure roller may be increased or reduced based on the condition of the fuser roller. For yet another example, print speed may be reduced to ensure print media spends a sufficient amount of time in the fusing area to appropriately fuse toner to the media. In this manner, the methods of FIGS. 5 and 6 may provide a user with information regarding the condition of components or maintenance, such that the user may avoid or anticipate downtime of a print apparatus.

Although the flow diagrams of FIGS. 5-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

FIG. 7 depicts example components of an example print apparatus 700 that uses acoustics to detect a wear pattern. The print apparatus 700 generally includes a heatable roller 702, a pressure roller 752, and a wear detection engine comprising a tone emitter 714, a microphone 716, a signal processor 758, and a digital controller 718. Print media 750 may pass between the pressure roller 752 and the heatable roller 702. The tone emitter 714 of FIG. 7 includes a tone arm 754 that extends towards a surface 762 of the heatable roller 702.

The surface 762 may be worn, having a regular or irregular surface structure due to wear. For example, the surface 762 of the heatable roller 702 may include peaks and valleys of a deteriorative layer, such as peaks 764, 766, and 768. As the tone arm 754 passes over a peak, the valley afterwards allows for the tone arm 754 to generate an audible sound picked up by the microphone 716 and processible by the signal processor 758.

The digital controller 718 evaluates the processed signal to identify a degree of wear of the heatable roller 702. For example, the digital controller 718 may include a memory resource with a control program stored thereon that, when executed, causes the controller 718 to process a sound signal from the microphone 716 and identify a change in frequency or amplitude of the sound generated by the tone arm 754. In this example, the tone emitter 714 acts as an emitter of a wear detection engine, such as emitter 314 of FIG. 3A, by conveying, towards the fuser roller 102, a material structure capable of making an audible sound, and the microphone 716 acts as a detector of a wear detection engine, such as detector 316 of FIG. 3A, by being oriented towards the end of the tone arm that contacts the fuser roller surface and receiving the audible sound generated by the tone arm 754.

The components discussed herein may be adapted to use any appropriate frequency in the human audible spectrum (e.g., 20-20000 hz) or outside of the human hearing range. In some examples, hard and soft layers may alternate within deteriorative layers to produce an audible code (e.g., an encoded combination of tones or a melody) revealed when worn past the first deteriorative layer, where the harder materials remain when worn to come into contact with the tone arm. In that example, the digital controller 718 may identify the condition of the fuser roller based on a degree of wear corresponding to the audible code or melody detected by the microphone 716. The digital controller 718 may provide a notification based on the audio signals received via the detector to suggest repair or replacement, as examples.

FIG. 8 depicts example components of an example print apparatus 800 that uses electricity to detect a wear pattern. The print apparatus 800 generally includes a heatable roller 802, a pressure roller 852, and a wear detection engine comprising an emitter 814, a detector 816, a signal processor 858, and a digital controller 818. Print media 850 may pass between the pressure roller 852 and the heatable roller 802. The emitter 814 of FIG. 8 includes a conductive whisker 854 that extends towards a surface 862 of the heatable roller 802. The conductive whisker 854 may be made of any conductive material.

The surface 862 may be worn, having a regular or irregular surface structure due to wear. The detector 816 may include a conductive whisker 856 made of a conductive material and extends towards the surface 862 of the heatable roller 802. The signal processor 858 receives signals corresponding to conductive properties received by the conductive whisker 856 when in contact with the surface 862 of the fuser roller 802. The digital controller 818 evaluates the processed signal corresponding to an electrical property of the conductive whisker 856 and compares the signal to a signal corresponding to a conductive property of the conductive whisker 854 provided by the emitter 814. The difference between the electrical properties of the conductive whiskers 854 and 856 may be identified by the difference in signals processed by the digital controller 818, The digital controller 818 may identify a degree of wear of the heatable roller 802 based on an electrical property, such as conductance, capacitance, surface charge, and the like. For example, the controller 818 may include a memory resource with a control program stored thereon that, when executed, causes the controller 818 to measure an electrical property of material between the first conductive whisker 854 and the second conductive whisker 856. In that example, the plurality of layers of the heatable roller 802 may include alternating insulative layers and selectively placed conductive paths.

The controller 818 may compare the electrical property identified via the detector 816 to a benchmark value or historical value to identify the condition of the fuser roller based on the degree of wear of the surface of the fuser roller. For example, a crack in the fuser roller may be detected in an example roller having two layers acting as charge plates where the capacitance becomes resistance identified by the detector whisker when the fuser roller is cracked. The digital controller 818 may identify the condition of the fuser roller 802 and provide a notification corresponding to recommendation to service or replace the fuser roller 802.

FIGS. 9 and 10 depict example components of example print apparatus 900 and 1000 that use light to detect a wear pattern. The print apparatus 900 generally includes a heatable roller 902, a pressure roller 952, and a wear detection engine comprising an emitter 914, a detector 916, a signal processor 958, and a digital controller 918. Print media 950 may pass between the pressure roller 952 and the heatable roller 902.

The emitter 914 of FIG. 9 includes a light source oriented towards a surface 962 of the heatable roller 902. The emitter 914 directs light from the light source towards the surface 962 of the fuser roller 902. The surface 962 reflects the light from the emitter 914. The detector 916 receives light reflected from the surface 962.

The surface 962 may be worn, having a regular or irregular surface structure due to wear and the light reflected by the surface 962 may vary based on the surface contour. The signal processor 958 receives a signal corresponding to light properties received by the detector 916. The digital controller 918 evaluates the processed signal corresponding to the light property and compares the signal to a signal corresponding to an expected reflected property. The difference assists the digital controller 918 to identify a degree of wear of the heatable roller 902 based on the reflected light property. The property of lights useable with implementations of the wear detection engine include fluorescence, reflectance, phosphorescence, color, wavelength, refraction, polarization, transmissivity, and the like. For example, the controller includes a memory resource with a control program stored thereon that, when executed, causes the controller to process a signal corresponding to light reflected from the cylindrical surface and compare data corresponding to the signal to a benchmark corresponding to light reflected from a new fuser layer. The digital controller 918 may identify the condition of the fuser roller 902 and provide a notification corresponding to recommendation to service or replace the fuser roller 902.

Referring to FIG. 10, the print apparatus 1000 may include the same components as print apparatus 900 of FIG. 9 with the difference where the emitter 1014 is located within the heatable roller 1002 rather than on the exterior of the heatable roller as depicted in FIG. 9. Similarly, print media 1050 may pass between the pressure roller 1052 and the heatable roller 1002. In the example of FIG. 10, the heatable core may include a window through which light is directed from the emitter 1014. The light may pass through a layer 1062 before reaching the detector 1016. In this manner, the detector 1016 receives light affected by the layer 1062 which may change over time due to wear on the layer 1062.

In some examples, the light received by the detector 1016 may be affected by a plurality of deteriorative layers, such a plurality of deteriorative layers having differing levels of polarization. In that example, the emitter 1014 conveys light towards the detector 1016, the detector 1016 detects a degree of diffraction corresponding to a remaining polarization pattern of the fuser roller surface (e.g., the worn layers, such as layer 1062), and the combination of the signal processor 1058 and digital controller 1018 includes a memory resource with a control program stored thereon that, when executed, causes the signal processor 1058 to process a signal corresponding to light reflected from the cylindrical surface and causes the digital controller 1018 to compare data corresponding to the processed signal to a benchmark corresponding to light reflected from a new fuser layer (or a fuser of the same age depending on the implementation). In that example, as a polarization layer wears off, the reflected light is diffracted to less of a degree and the digital controller 1018 identifies changes to the polarization pattern and may track the changes over time. In other examples, the digital controller may track operational conditions (such as tracking environmental conditions, the type of media passing on the surface of the fuser, or thermal cycles of the heatable roller), where operation under such conditions may affect the analysis of the degree of wear and resulting condition of the fuser roller. The digital controller 1018 may identify the condition of the fuser roller 1002 and provide a notification corresponding to recommendation to service or replace the fuser roller 1002 when the diffraction levels reduce below a threshold, for example.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location but are merely used to distinguish separate claim elements.

The present description has been shown and described with reference to the foregoing examples. It is understood, however, that other forms, details, and examples may be made without departing from the spirit and scope of the following claims.

What is claimed is:

1. A print apparatus comprising:
   a fuser roller having a first section of a cylindrical surface and a second section of the cylindrical surface, the first section of the cylindrical surface being a media handling section;
   a pressure device couplable to the fuser roller, the pressure device to generate wear on the second section of the cylindrical surface corresponding to use of the first section; and
   a wear detection engine to identify a degree of wear of the second section of the cylindrical surface.

2. The print apparatus of claim 1, wherein the wear detection engine includes:
   an emitter emits towards the cylindrical surface;
   a detector oriented to receive from the cylindrical surface; and
   a controller having a control program to process data received from the detector.

3. The print apparatus of claim 2, wherein:
   the emitter is located within the fuser roller;
   the emitter sends a light beam towards the detector;
   the controller includes a memory resource with a control program stored thereon that, when executed, causes the controller to:
      process a signal corresponding to light reflected from the cylindrical surface; and
      compare data corresponding to the signal to a benchmark corresponding to light reflected from a new fuser layer.

4. The print apparatus of claim 2, wherein:
   the emitter is a first conductive whisker;
   the detector is a second conductive whisker; and
   the controller includes a memory resource with a control program stored thereon that, when executed, causes the controller to measure an electrical property of material between the first conductive whisker and the second conductive whisker.

5. The print apparatus of claim 2, wherein:
   the emitter is a tone arm that emits a tone;
   the detector is a microphone; and
   the controller includes a memory resource with a control program stored thereon that, when executed, causes the controller to process a sound signal from the microphone and identify a change in frequency or amplitude.

6. The print apparatus of claim 2, further comprising:
an indicator; wherein
the controller includes a memory resource having instructions stored thereon that, when executed, causes the controller to:
determine a future condition of the fuser roller based on an analysis of data from the detector; and
activate the indicator to represent the future condition of the fuser roller.

7. The print apparatus of claim 2, wherein the fuser roller comprises:
a number of layers with different properties with respect to the emission of the emitter; and
the control program includes instructions that, when executed, causes the controller to identify a condition of the fuser roller based on data from the detector corresponding a combination of the different properties based on wear of the fuser roller.

8. The print apparatus of claim 1, wherein the wear detection engine includes:
an image capture device; and
a controller having a memory resource with a control program stored thereon that, when executed, causes the controller to process image data of the image capture device.

9. A fuser roller comprising:
a tube;
a heating element coupled to the tube;
a first deteriorative layer applied to the tube, the first deteriorative layer corresponding to a first detectable pattern; and
a second deteriorative layer applied to the tube, the second deteriorative layer corresponding to a second detectable pattern that is different or offset with respect to the first detectable pattern,
wherein the first detectable pattern and the second detectable pattern are optically detectable, or the first detectable pattern and the second detectable pattern are sound-detectable.

10. The fuser roller of claim 9, wherein:
the first detectable pattern includes a combination of a first material and a second material, the second material having a different material property with respect to the first material; and
the second detectable pattern includes a combination of the first material and the second material, the different material property of the second material of the second detectable pattern located at a location different from the location of the different material property of the second material of the first detectable pattern.

11. The fuser roller of claim 9, wherein the first detectable pattern and the second detectable pattern are optically detectable.

12. The fuser roller of claim 9, wherein the first detectable pattern and the second detectable pattern are sound-detectable.

13. A print apparatus comprising:
a fuser roller comprising:
a heatable core; and
a plurality of deteriorative layers coupled to the heatable core, each deteriorative layer including a material property different from other deteriorative layers;
a wear detection engine comprising:
an emitter;
a detector; and
a controller including:
a processor resource; and
a memory resource having instructions stored thereon that when executed by the processor resource cause the controller to:
activate the emitter towards the fuser roller;
identify a wear pattern based on data provided by the detector in response to activation of the emitter, the data corresponding to the material property exposed on a surface of the fuser roller; and
determine a degree of wear of the fuser roller based on the identified wear pattern,
wherein the emitter and the detector are respectively an optical emitter and an optical detector, or the emitter and the detector are respectively a sound emitter and a sound detector.

14. The print apparatus of claim 13, wherein:
the instructions cause the controller to compare a media handling section of the fuser roller to a non-media handling section of the fuser roller; and
each wear pattern is composed data corresponding to sections of a first material and a second material, the second material denser than the first material.

15. The print apparatus of claim 13, wherein:
the plurality of deteriorative layers includes layers of differing levels of polarization;
the emitter conveys light; and
the detector detects a degree of diffraction corresponding to a remaining polarization pattern of the fuser roller.

16. The print apparatus of claim 13, wherein the deteriorative layers include an encoded pattern exposable based on wear to the fuser roller and the instructions cause the controller to:
identify the encoded pattern exposed on the fuser roller; and
identify a condition of the fuser roller based on the encoded pattern.

17. The print apparatus of 11, wherein the instructions cause the controller to:
track an operational factor corresponding to a print component; and
operate the print component at a level corresponding to the determined degree of wear.

18. The print apparatus of claim 13, wherein the emitter is the optical emitter and the detector is the optical detector.

19. The print apparatus of claim 13, wherein the emitter is the sound emitter and the detector is the sound detector.

* * * * *